Patented Mar. 7, 1939

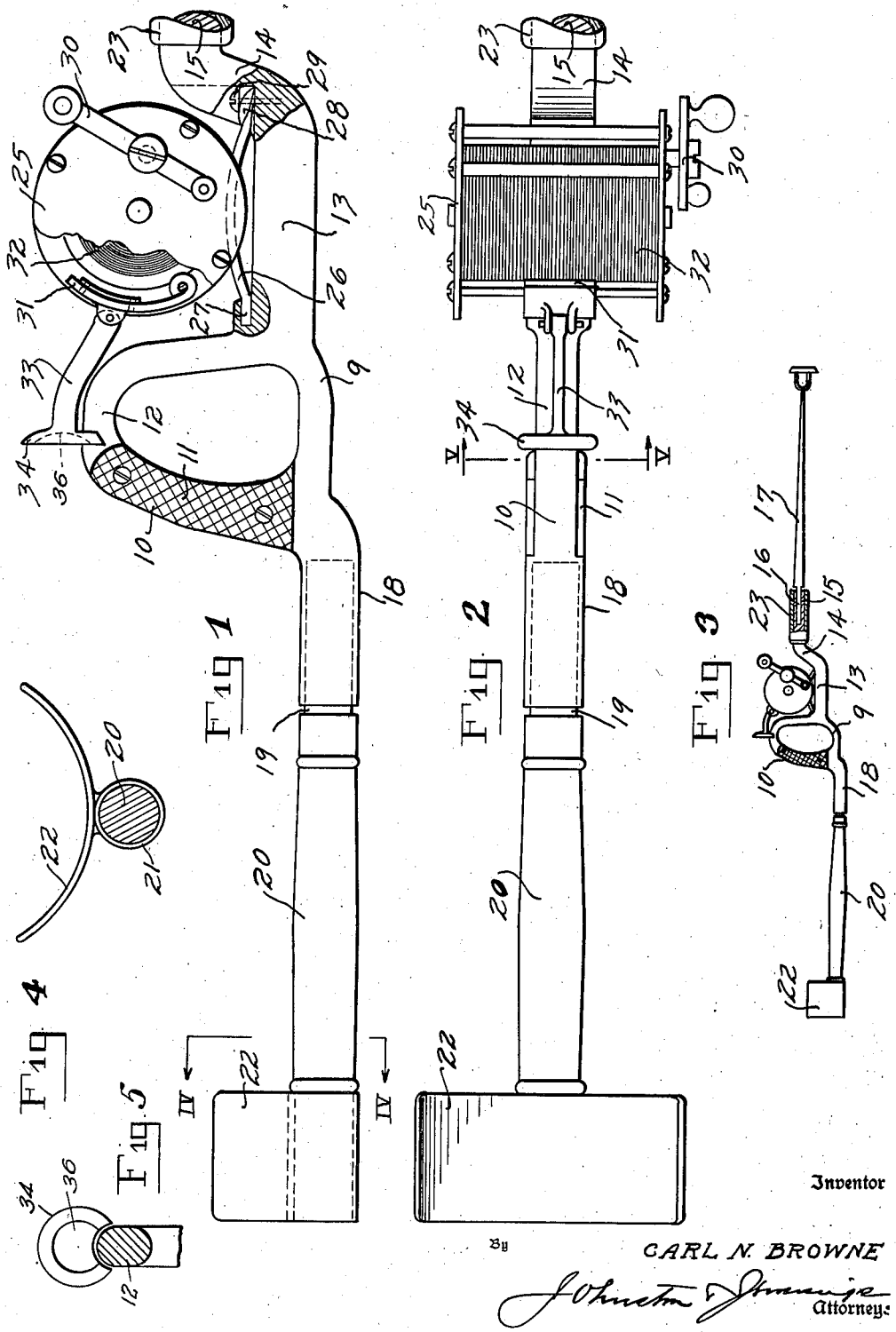

2,149,837

UNITED STATES PATENT OFFICE 2,149,837

FISHING ROD HANDLE

Carl N. Browne, Panama City, Fla., assignor of one-half to I. F. McDonnell, Birmingham, Ala.

Application August 23, 1937, Serial No. 160,374

7 Claims. (Cl. 43—23)

My invention relates to fishing rods and more particularly to a novel reel bearing handle for increasing the grip on, and the control by leverage of, the pole.

More particularly, my invention comprises a sectional fishing pole comprising an intermediate handle portion provided with means for demountable assemblage therewith of a forwardly extending pole section and a rearwardly extending arm brace.

The prime object of my invention is to provide the handle portion with a pistol grip disposed immediately at the rear of a depressed reel seat and above the level of the arm brace which is connected thereto at a substantially lower level than the pole.

The objects of these arrangements are to provide a powerful grip and leverage control for the pole with the reel set low to reduce the lateral rocking or side strains on the wrist to a minimum.

My invention further comprises the provision at the rear end of the arm brace of a curved seat in which the elbow will fit so as to prevent any tendency of the brace to slip from under the arm under severe lateral strains applied at the tip of the pole. This will provide for the maximum freedom of play for the rod bearing arm while handling a fish.

My invention further comprises the novel details of construction and arrangements of parts which, in their preferred embodiment only, are illustrated in the accompanying drawing, in which:

Fig. 1 is an enlarged view in side elevation, partly in section, of the pole handle with the rear arm brace in place but with the forward handle portion, in which the pole is mounted, shown broken away.

Fig. 2 is a plan view of Fig. 1.

Fig. 3 is a small sized view in side elevation of a complete pole.

Fig. 4 is a sectional view taken on the line IV—IV of Fig. 1.

Fig. 5 is a sectional view taken along the line V—V of Fig. 2.

Similar reference numerals refer to similar parts throughout the drawing.

In the embodiment of my invention illustrated, the handle portion 9, as customarily made, comprises a metallic unitary frame having a vertically disposed handle portion 10 with suitably knurled side grip plates 11 applied to opposite sides thereof while the top portion 12 of the handle curves over and downwardly to its junction with the base and the reel bearing portion 13.

This reel bearing portion 13 at its forward end turns up at 14 and then forwardly and horizontally to form the shank 15 which is recessed at its forward end to provide a socket 16 into which the butt end of the pole 17 is adapted to demountably interfit. A handle 23 is mounted on the shank 15 and may be made of cork or any material suitable for a hand grip.

The bottom portion of the handle provides a downwardly offset rearwardly extending socketed extension 18 adapted to receive a metallic ferrule 19 fitted on the forward end of the arm brace 20, which at its rear end is fitted into a socket 21 which carries a curved elbow seat 22.

The reel seat 13 is adapted for the reel 25 to be demountably interlocked therewith. This reel may be of any suitable construction and design and as is customary it has a transversely arched curved metal base 26 which at its rear end fits under a socketed shoulder 27 and at its forward end is engaged under a clamp 28 that is held in position by a clamp screw 29. The reel carries the usual handle 30 and a pivoted brake plate 31 carrying a pad of any suitable brake material adapted to engage the coiled fishing line 32 on the reel. The brake is controlled by a brake lever 33, pivotally connected at its forward end to the brake plate 31, and at its rear end provided with an upstanding thumb plate 34 slotted at 63 to straddle and slide on the top portion of the handle 12 as a guide. Preferably the thumb plate is recessed to give a more secure purchase for applying the brake.

By reference to Fig. 3 it will be noted that the handle portion 9, the arm brace 20, and the pole 17 all form sections of about the same length, though obviously a sectional or single piece pole of any desired length may be used. When the members 17 and 20 are disengaged from the handle portion 9, the pole can be packed for convenient handling.

Having assembled the parts in the manner described, when the handle 10 is grasped, the elbow seat 22 will be in position to engage under the elbow of the arm gripping the handle. The forward handle 23 will be in convenient position to be grasped by the other hand, when the latter is not needed for manipulation of the reel.

The low seat 13 for the reel sets the reel center practically level with the middle of the handle 10 and the position of the shank 15 also brings the pole nearly in line with the middle portion of the handle 10, while the socket 18 presents brace 20 in position to lie along under the fore arm.

The arrangement of parts thus described affords a very firm hand grip for the pole with powerful leverage available from the elbow brace. The curved seat 22 prevents the brace 20 slipping from under the arm and leaves the pole bearing arm entirely free for any desired manipulation of the pole while handling the fish.

The low mounting of the reel reduces to a minimum the turn over or side motion strain that becomes very severe at times in the use of the pole, and the position of the grip 10 associated with the elbow brace relieves the wrist of severe strain, so that the whole fishing rod is brought into a nice balance under powerful control well adapted for both a straight line pull when reeling in the fish, and for an angular position for the pole, while playing the fish.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. In a fishing pole handle, a metallic frame comprising a rearwardly facing back brace socket, an intermediate upstanding handle grip, a reel seat depressed below the middle level of said grip, and a forwardly facing front pole socket substantially level with the middle of said grip and a rear arm brace mounted in said rearwardly facing socket.

2. In a fishing pole handle, a frame comprising an upstanding grip portion, a reel seat, and a pole receiving socket, means to mount an arm brace to the rear end of the frame below the grip level, and a curved arm grip at the free end of said brace.

3. In a fishing pole handle, a grip, a reel seat, a rear brace socket, a forward pole socket, and a brace applied to fit into said rear socket and carrying a curved elbow fitting seat at its rear end.

4. A handle for a fishing rod having a reel mounted thereon comprising a hand grip member rising vertically behind the reel, a member extending rearwardly from the hand grip in position to lie beneath the fore arm of the user when in use, and a seat for the fore arm carried by the rearwardly extending member.

5. A handle for a fishing rod having a reel mounted thereon comprising a hand grip member rising vertically immediately behind the reel, a socketed member to the rear of the hand grip, an extension fitting in the socketed member and adapted to lie beneath the fore arm of the user, and an arcuate fore arm seat at the rear of the extension.

6. A handle for a fishing rod having a reel mounted thereon, comprising a hand grip extending upwardly in a loop immediately behind the reel, a brake guide for the reel embodied in the hand grip, a rearwardly extending handle portion joined to the hand grip, and a curved fore arm seat carried by the rearwardly extending portion.

7. In a fishing pole having a reel seat, a handle portion comprising a grip disposed immediately to the rear of the reel seat, a rear brace socket, a brace adapted to fit into said rear socket and in length substantially coextensive with the fore arm grasping said handle portion, and a transversely disposed vertically curved arm fitting seat rigidly carried on the rear end of said brace.

CARL N. BROWNE.